(12) United States Patent
Wang

(10) Patent No.: US 6,488,168 B1
(45) Date of Patent: Dec. 3, 2002

(54) ARTICLE-STORING BOX PLACED IN AN AUTOMOBILE TRUNK

(76) Inventor: Chu-Li Wang, No. 295, Lane 168, Sec. 1, Chang Hsi Road, Tainan (TW)

( * ) Notice: Subject to any disclaimer, the term of this patent is extended or adjusted under 35 U.S.C. 154(b) by 0 days.

(21) Appl. No.: 09/908,585

(22) Filed: Jul. 20, 2001

(51) Int. Cl.⁷ ............................................ B60R 7/02
(52) U.S. Cl. ........................ 220/7; 220/6; 224/542; 224/925
(58) Field of Search ................. 220/6, 7; 124/542, 124/925

(56) References Cited

U.S. PATENT DOCUMENTS

| | | | | |
|---|---|---|---|---|
| 5,215,205 A | * | 6/1993 | Behlman | 220/4.31 |
| 6,015,071 A | * | 1/2000 | Adomeit et al. | 220/6 |
| 6,026,646 A | * | 2/2000 | Hansen et al. | 220/6 |
| 6,056,177 A | * | 5/2000 | Schneider | 220/4.28 |
| 6,253,943 B1 | * | 7/2001 | Spykerman et al. | 220/6 |
| 6,375,055 B1 | * | 4/2002 | Spykerman et al. | 108/12 |

* cited by examiner

Primary Examiner—Joseph M. Moy
(74) Attorney, Agent, or Firm—Bacon & Thomas, PLLC

(57) ABSTRACT

An article-storing box placed in automobile trunk includes a bottom base, two lateral side plates, two lengthwise side plates and plural separating plates. The bottom base is provided with a chamber having stepped surfaces on two lengthwise sidewalls. The lateral side plates respectively have their bottom sides fitted pivotally between the two stepped surfaces of the chamber, having two insert blocks movable in two opposite sides. The lengthwise side plates respectively have their bottom sides disposed pivotally between the two stepped surfaces of the chamber, two hooks for receiving two insert blocks of the lateral side plates and plural guide grooves for the separating plates to insert therein. The separating plates are movable and have the same structure as that of the lateral side plates. The article-storing box can be separated into several compartments for storing different articles and is collapsible to take small space in an automobile trunk.

7 Claims, 13 Drawing Sheets

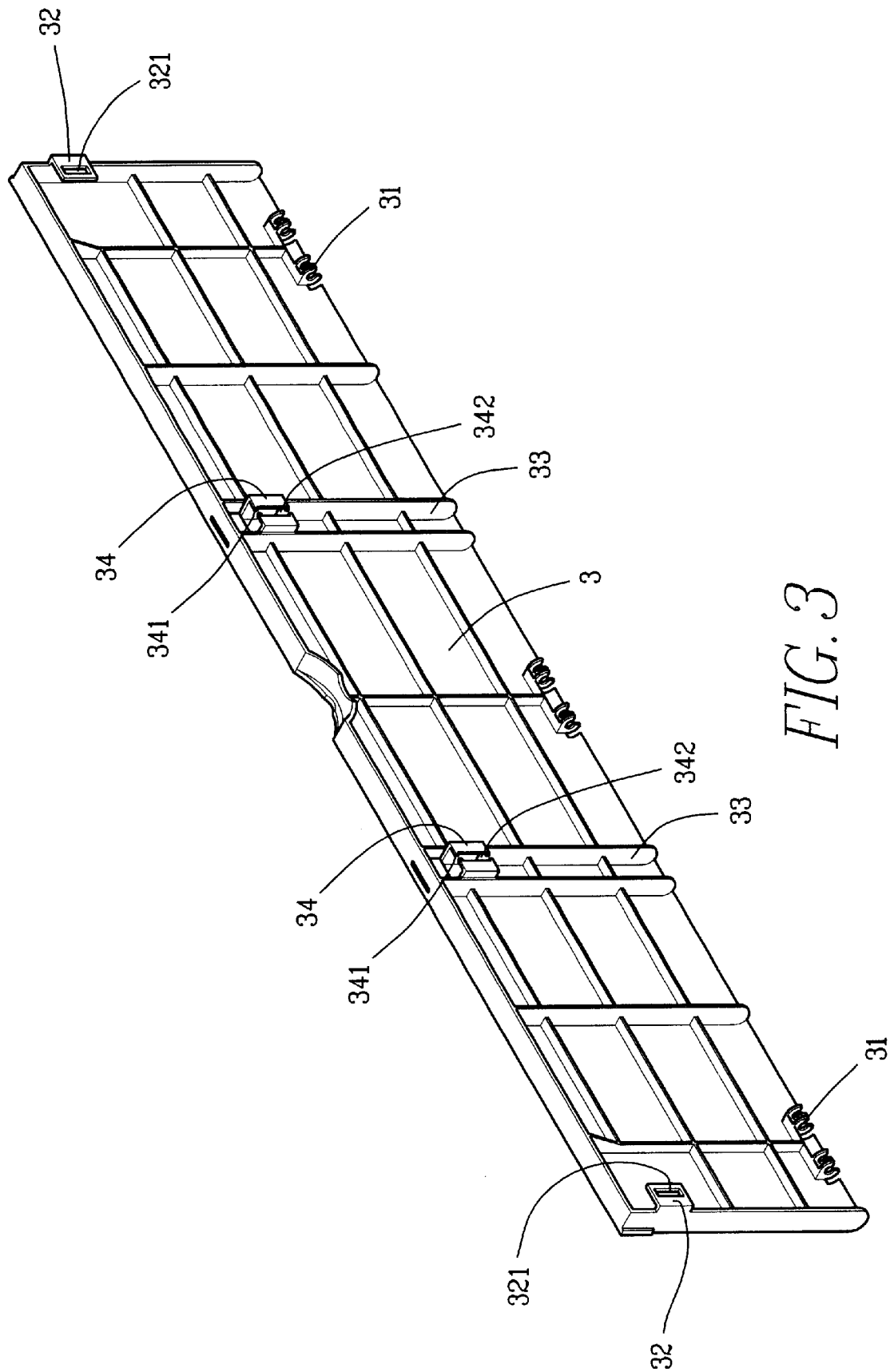

ARTICLE-STORING BOX PLACED IN AN AUTOMOBILE TRUNK

BACKGROUND OF THE INVENTION

This invention relates to an article-storing box placed in an auto mobile trunk, particularly to one possible to be collapsed, taking small space and convenient to put articles in it or take them out.

Generally, consumers are used to putting various articles just bought from a supermarket or a shopping center directly into their automobile trunk, letting raw meat or fish mingled with cooked food and the like and resulting in a filthy condition not hygienic at all.

To solve such a problem, article-storing boxes to be placed in an automobile trunk have come into existence in recent years. Such an article-storing box has plural detachable separating plates provided inside to form several compartments for storing different articles, as disclosed in a Taiwan Patent Publication No. 299731 and in an U.S. Pat. No. 5,584,412.

The aforesaid article-storing box has an advantage of storing articles by classification, but cannot be collapsed, so it takes big space in an automobile trunk even if it is empty, causing inconvenience in transporting or carrying.

SUMMARY OF THE INVENTION

The objective of this invention is to offer an article-storing box placed in an automobile trunk, capable to be collapsed, needing only small space and easy to put articles in it or take them out.

The article-storing box in this invention includes a bottom base, a pair of lateral side plates, a pair of lengthwise plates and plural separating plates. The bottom base is formed integral and has a chamber in the center. The front and the rear ails of the chamber are respectively formed with a stepped surface having a plurality of pivotal connectors protruding up and a flexible tongue is oppositely formed in a center portion of the left and the right wall of the chamber, with each tongue having a stop member protruding toward the interior of the chamber. The bottom base further has a hollow grip integrally formed protruding out of the front side.

The bottom ends of the two lateral side plates are respectively fitted pivotally and vertically between the two stepped surfaces of the left and the right wall of the chamber to let the two lateral side plates capable to be pivotally swung up and down to be placed horizontally between two stepped surfaces of the chamber when collapsed. Then a through hole is bored in the middle section near the top edge of each lateral side plate, and an insert groove is bored in two opposite sides of each lateral side plate, and further two movable insert blocks fitting in the two insert grooves are respectively provided in two opposite sides of each lateral side plate.

Each lengthwise side plate has its bottom side pivotally combined with the pivotal connectors on each stepped surface of the chamber to let the two lengthwise side plates pivotally swung up and down to rest horizontally on the lateral side plates when collapsed. Two hooks conforming to the two insert grooves of each lateral side plate are formed integral on two opposite ends of each lengthwise side plate, and each hook has an insert hole. Besides, plural guide grooves are formed integral in the inner wall of each lengthwise side plate, each tide groove has a position member aligned with the hook, and each position member is broed with a recess in the center, with the recess having an expanded position hole in an intermediate portion.

A plurality of separating plates are provided to have the same structure as the lateral side plates, respectively having a through hole in the middle section near its top edge and two insert grooves and two insert blocks provided in two sides, but detachable not pivotally combined with the bottom base.

In assembling for use, pivotally swing up the lengthwise side plates and the lateral side plates orderly to make them stand upright on the bottom base, with the hooks of the cover inserted into the insert grooves of the lateral side plates orderly from a collapsed condition of the article-storing box. Then the insert blocks of the lateral side plates actuated to extend into the insert holes of the hooks. Then each separating plate is fitted between two lengthwise side plates through the guide grooves in the inner walls of the lengthwise side plates, letting the insert blocks of the separating plates facing with the position member of the lengthwise side plates and activate the insert blocks of the separating plates to insert in the position holes of the position members, thus finishing assembly of the article-storing box for use.

BRIEF DESCRIPTION OF DRAWINGS

This invention will be better understood by referring to the accompanying drawings, wherein:

FIG. 3 is a perspective view of a cover plate in the present invention;

DETAILED DESCRIPTION OF THE PREFERRED EMBODIMENT

Figure 1:
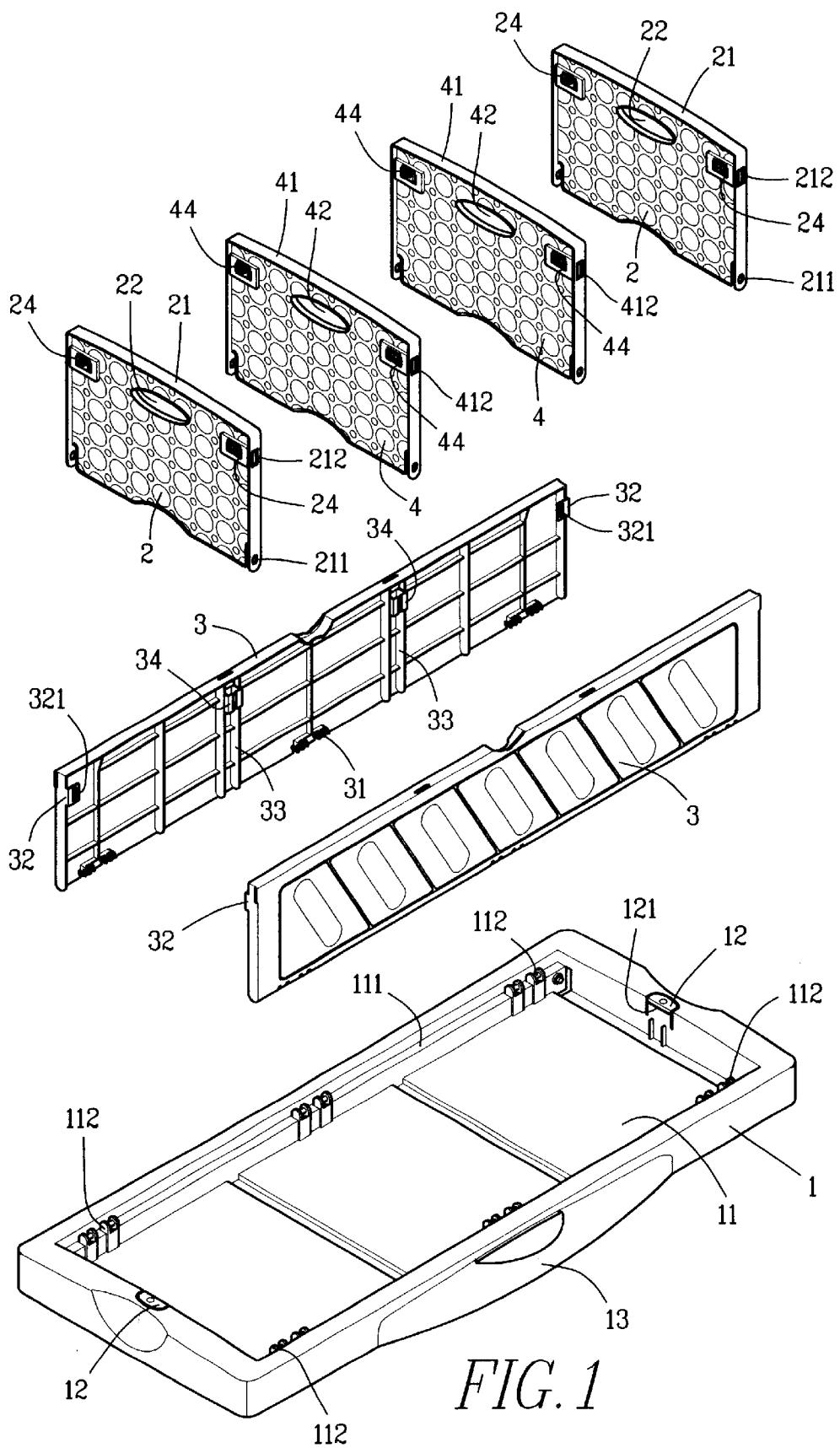
FIG. 1 is an exploded perspective view of an article-collecting box placed in an automobile trunk in the present invention.

An article-storing box placed in an automobile trunk in the present invention, as shown in FIG. 1, includes a bottom base 1, two lateral side plates 2, two lengthwise side plates 3 and plural separating plates 4 as main components combined together.

The bottom base 1 is formed integral, having a chamber 11 in the center. A stepped surface 111 is formed respectively on the front and the rear walls of the chamber 11, having plural pivotal connectors protruding up. Then, two flexible tongues 12 are respectively formed on the center of the left and the right walls of the chamber, each tongue having a stop member 121 protruding toward the interior of the chamber. Further, the bottom base 1 has a hollow grip 13 formed integral protruding out of its front side.

Figure 2:
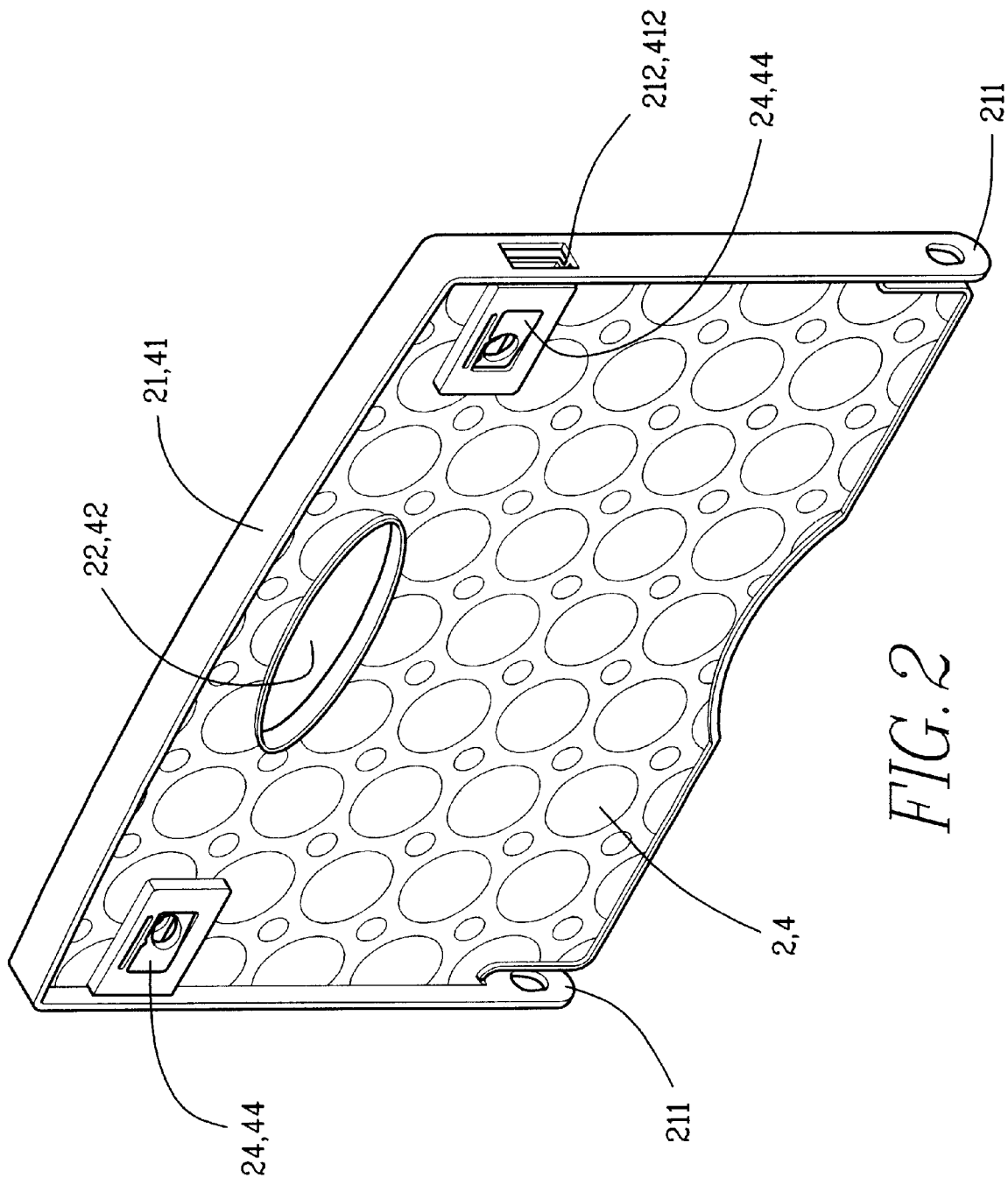
FIG. 2 is a perspective view of a side plate in the present invention.
Figure 2A:
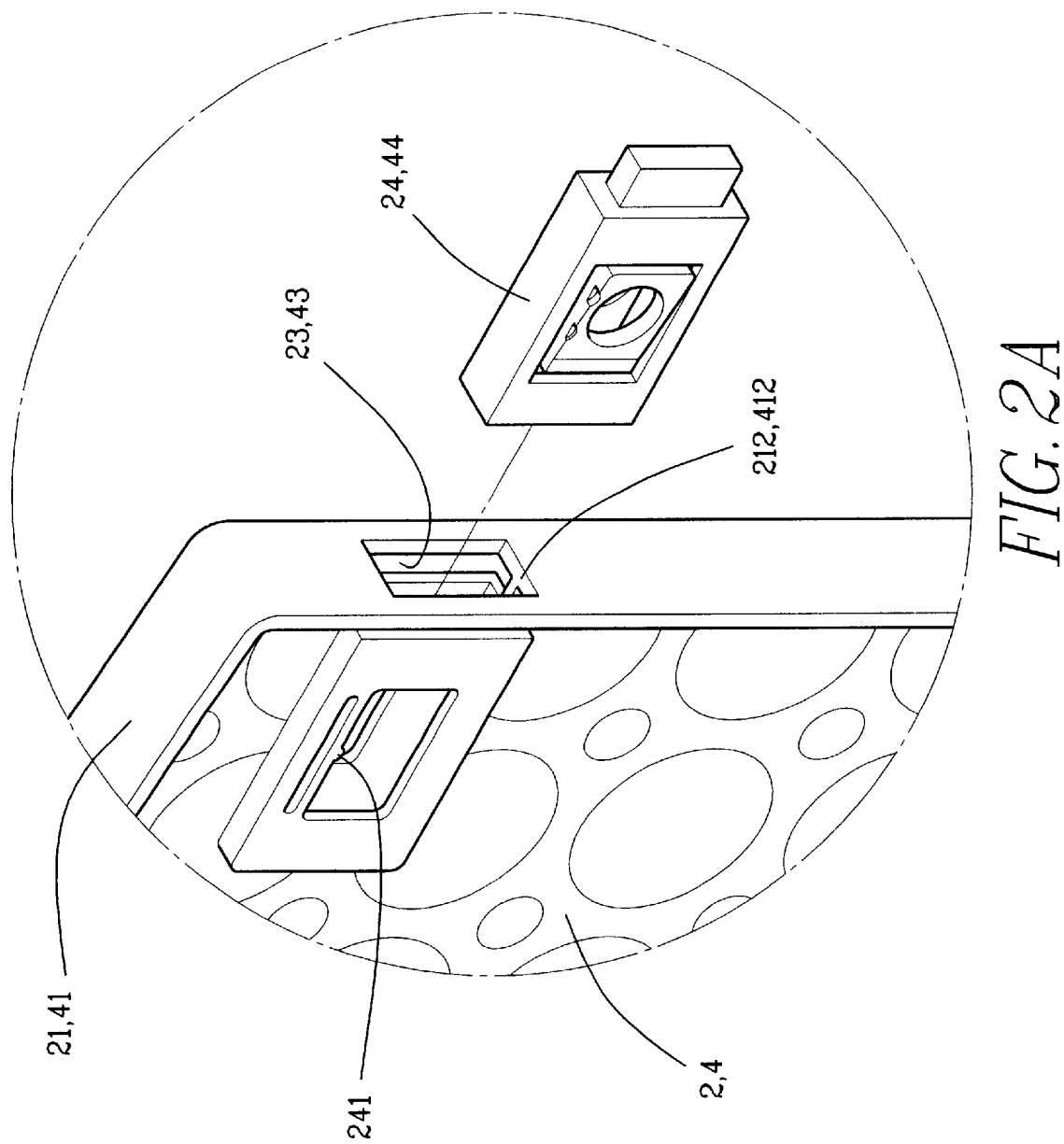
FIG. 2A is a partial magnified view of FIG. 2.

Each lateral side plates 2, referring to FIG. 2, has an inverted U-shaped rib 21 fixed around its circumferential edge and two lugs 211 respectively formed on the lower end of two vertical sides of the rib 21. Then, a through hole 22 is bored in a middle portion near the top edge, and an insert groove 23 are bored through two side edges of each lateral side plate 2. Further, two insert blocks 24 capable to be actuated to move and conforming to the two insert grooves 23 are fitted movably in the two insert grooves 23, and each insert block 24 has a projection 241 for positioning, as shown in FIG. 2A. Additionally, a slot 212 facing each insert groove 23 is bored in the rib 21 for the insert block 24 to pass through.

Each lengthwise side plate 3, referring to FIG. 3, is provided with plural pivotal lugs 31 protruding up on its bottom and pivotally connected with the pivotal connectors 112 on the stepped surfaces 111 of the chamber 11, and two hooks 32 respectively having an insert hole 321 are formed integral at two opposite sides of each lengthwise side plate 3 to match with the insert grooves 23 of each lateral side plate 2. In addition, each lengthwise side plate has a plurality of guide grooves 33 formed integral in its inner wall and a position member 34 aligned with the hook 32 of the cover plate 3 is formed integral on the upper portion of the guide groove 33, having a recess 341 in the center, and an expanded position hole formed in said recess 341.

The separating plates 4 are movable, having the same structure as that of the lateral side plates 2, as shown in FIG. 2 and 2A. Each separating plate 4 has an inverted U-shaped rib 41 fixed around its circumferential edge, two slots 412 respectively positioned on two opposite sides of the rib 41, a through holes 42 bored in upper center near its top edge and two insert grooves 43 provided in two opposite sides, and two insert blocks 44 provided to insert in the two insert grooves 43.

Figure 4:
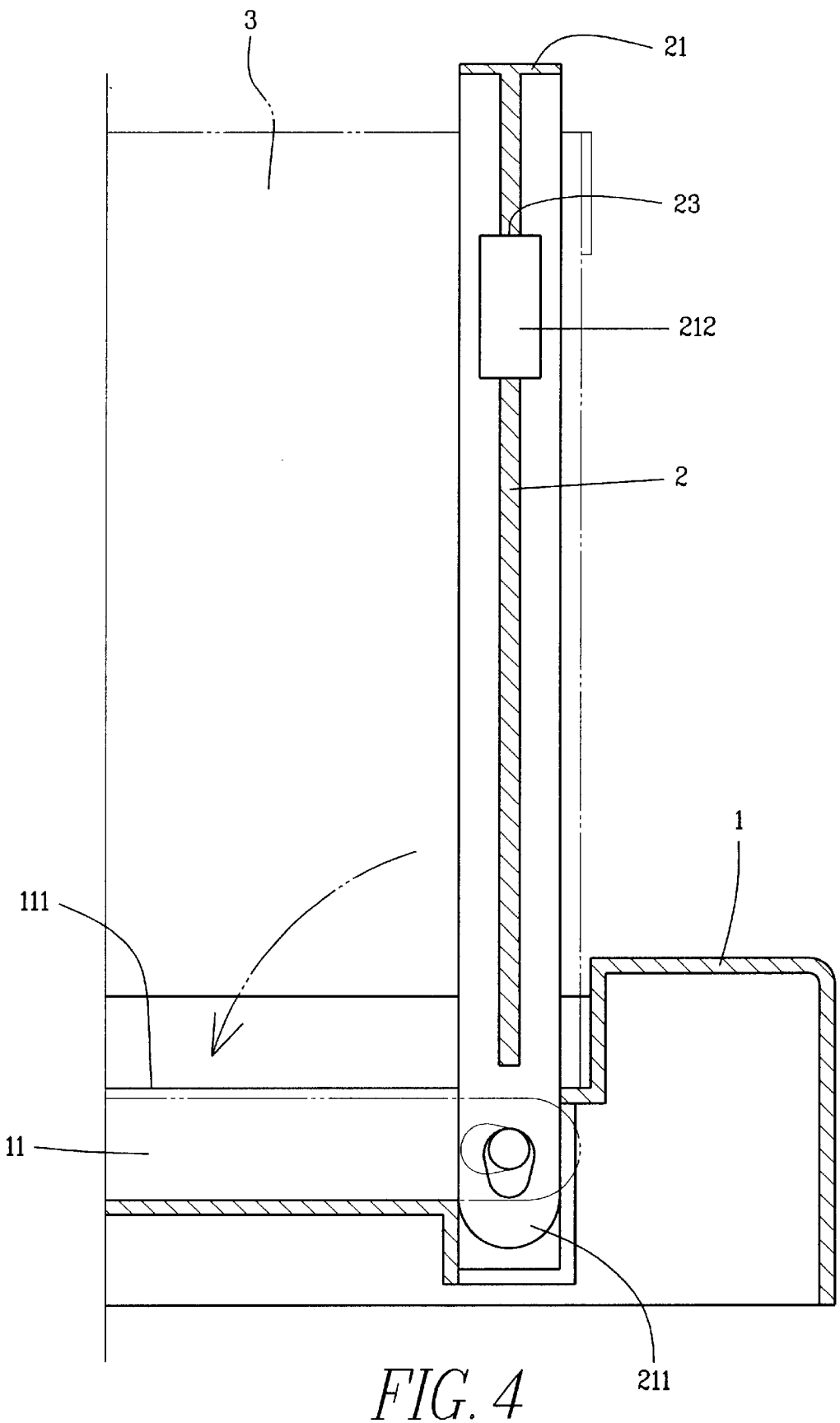
FIG. 4 is a partial front view of the side plate in assembling condition in the present invention.
Figure 5:
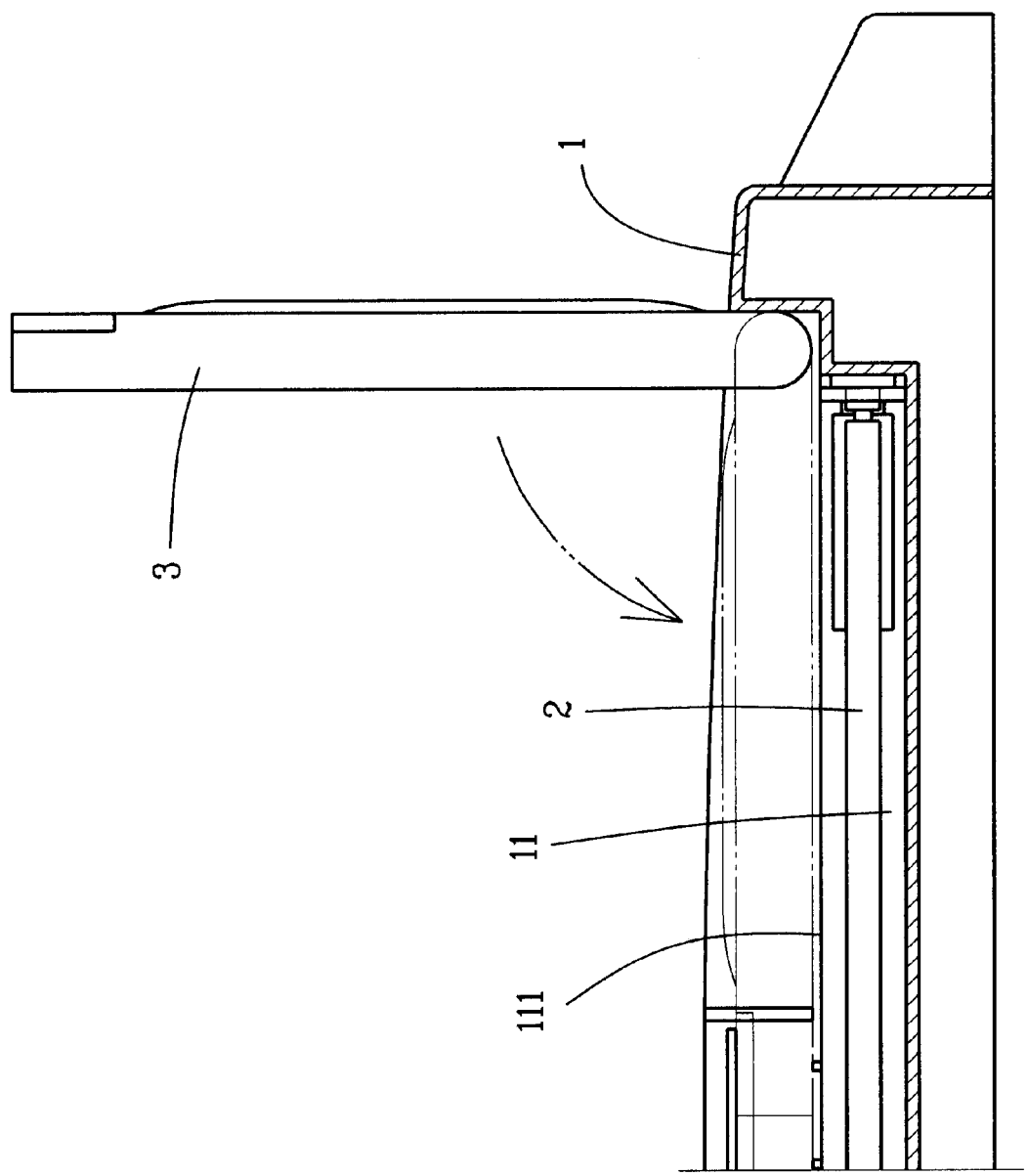
FIG. 5 is a partial front view of the cover plate in assembling condition in the present invention.

In assembling, referring to FIGS. 4, 5, 6, 7 and 8, firstly, two lugs 211 on the opposite lower sides of each lateral side plate 2 are pivotally fitted between the left and the right stepped surfaces 111 of the chamber 11, allowing the two lateral side plates 2 swing up and down freely and lie horizontally between the two stepped surfaces 111 when collapsed, as shown in FIG. 4. Next, the lengthwise side plates 3 have their pivotal lugs 31 on lower sides pivotally connected with the pivotal connectors 112 on the front and the rear stepped surfaces 111 of the chamber 11, letting the two lengthwise side plates 3 pivotally swing up and down to cover on the lateral side plates 2 when collapsed, as shown in FIG. 5.

Figure 6:
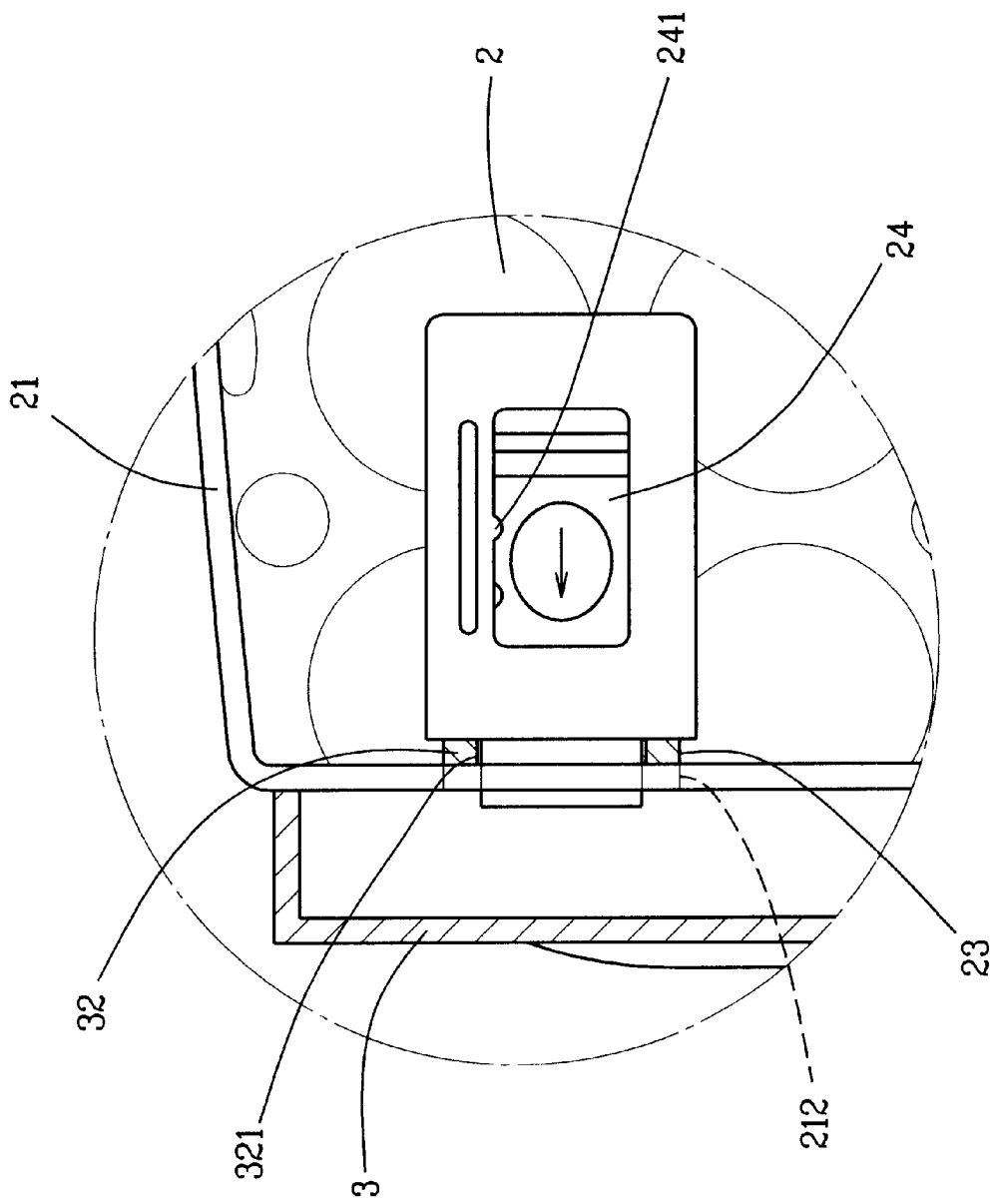
FIG. 6 is a cross-sectional view of the side plate and the cover plate assembled in place in the present invention.

In evolving the article-storing box for use from the collapsed condition, swing up the lengthwise side plates 3 and the lateral side plates 2 orderly to let them stand upright on the bottom base 1. Then, the hooks 32 on the opposite ends of the lengthwise side plates 3 are inserted into the insert grooves 23 of the lateral side plates 2, as shown in FIG. 6, and at the same time, the insert blocks 24 of the lateral side plates 2 are moved out and inserted in the insert holes 321 of the hooks 32 and also in the through holes 212 of the rib 21, accordingly making the lateral side plates 2 and the lengthwise side plate 3 assembled together in the evolved condition.

Figure 7:
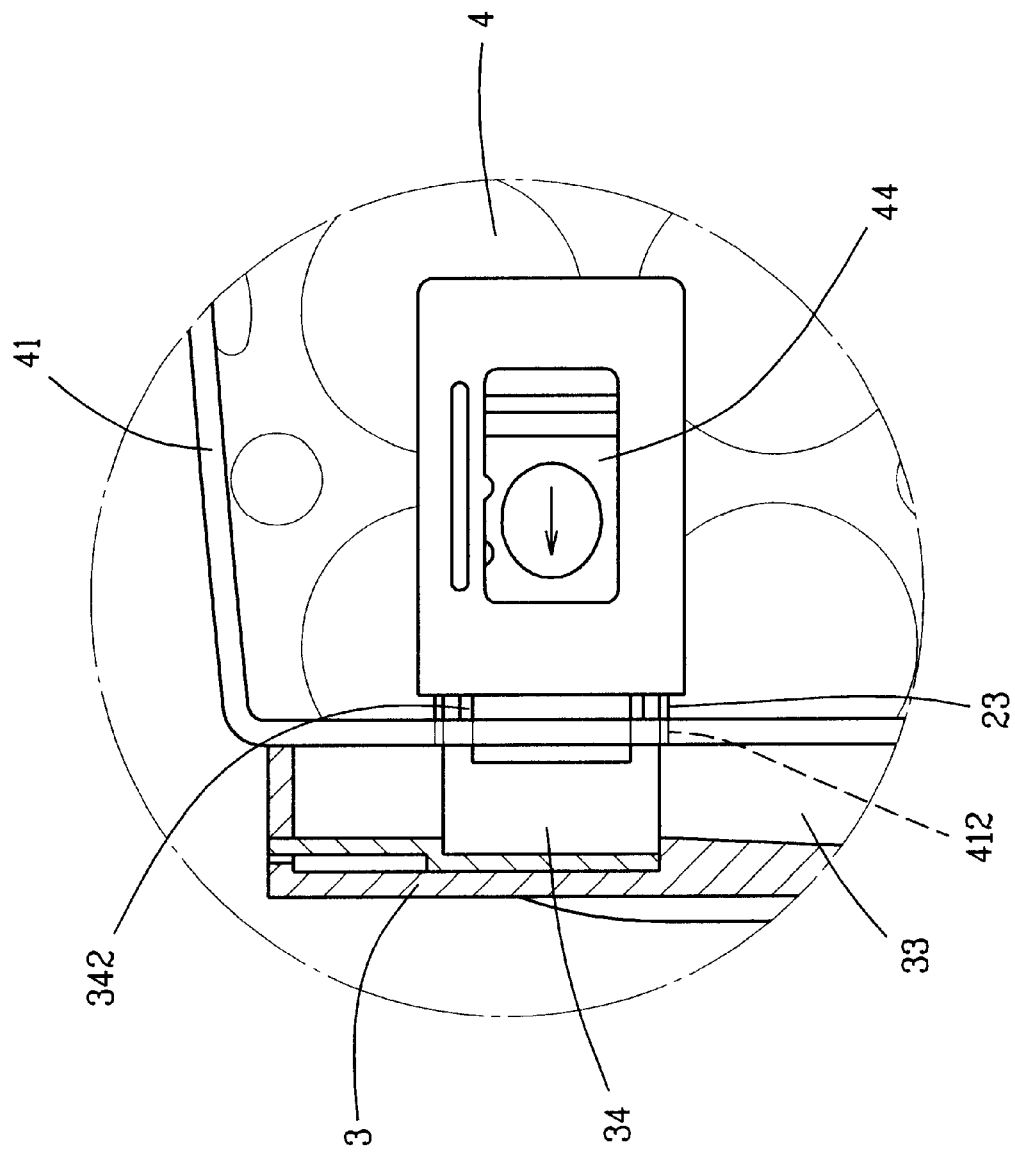
FIG. 7 is a cross-sectional view of the separating plate and the cover plate assembled in place in the present invention.

Next, insert the separating plates 4 in the guide grooves 33 on the inner walls of the cover plates 3, with two sides of the rib 41 passing through the recesses 341 of the two position members 34 of the cover plates 3 and then fit the separating plates 4 between the two lengthwise side plates 3, as shown in FIG. 7. Synchronously, the insert blocks 44 of the separating plates 4 are moved out and inserted in the position holes 342 of the position members 34 and in the through holes 412 on opposite sides of the rib 41, thus finishing the assembly of an article-storing box in the evolved condition, having an open upper side and several (four illustrated in this example) separated spaces formed between the two lateral plates and the two separating plates 4 for storing different articles.

Because of such a design as described above, articles bought can be classified first and then put into different compartments of the article-collecting box placed in the automobile trunk so as to prevent raw meat or fish from mingling with cooked food or the like. And, if all the separating plates 4 are taken out, the space of the article-storing box will become large enough to store large-sized articles. Besides, the through holes 22 preset on the lateral side plates 2 facilitates a user to lift up the article-storing box and then move it into a room for unloading the articles.

Figure 8:
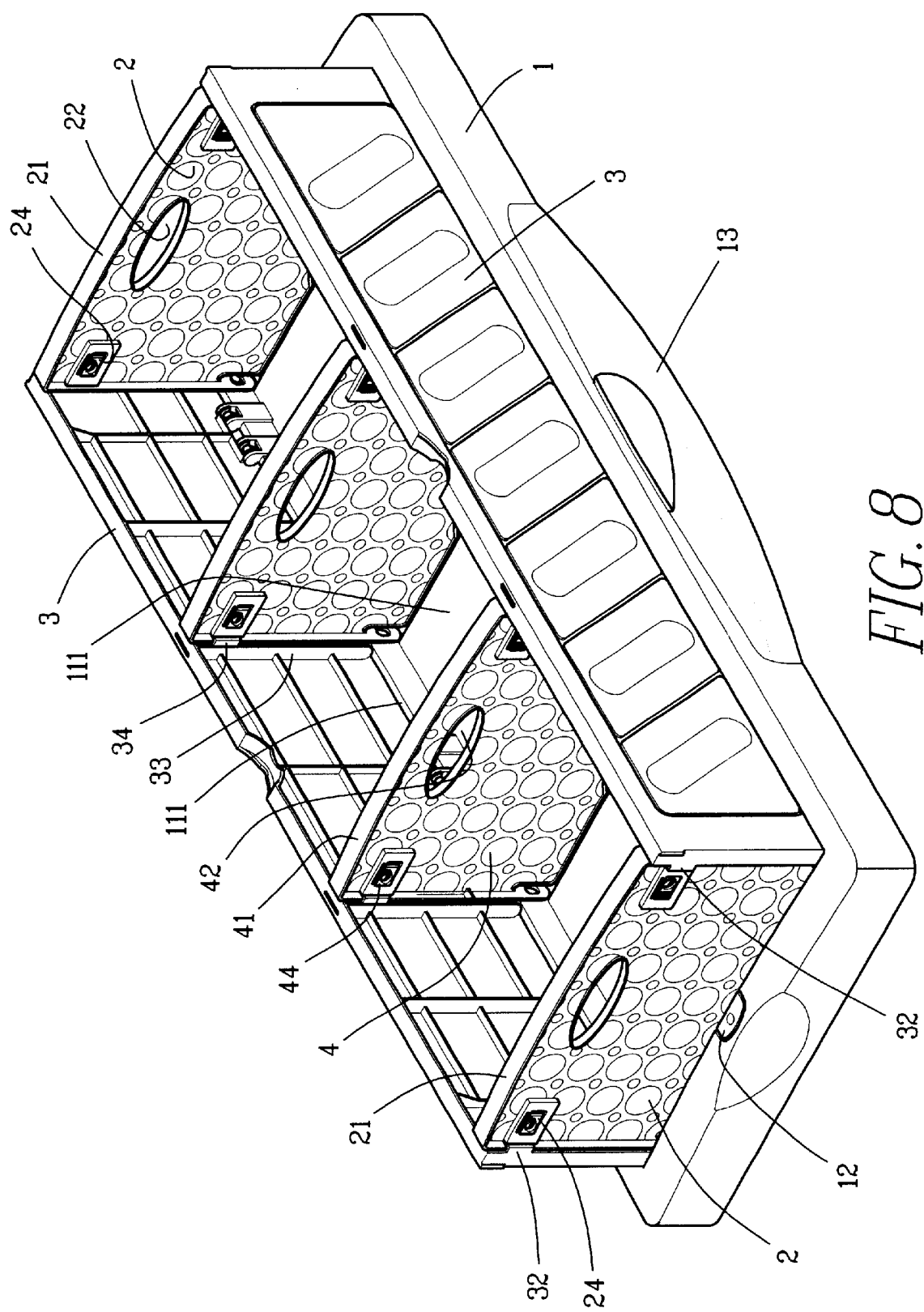
FIG. 8 is a perspective view of the article-collecting box in the present invention.
Figure 9:
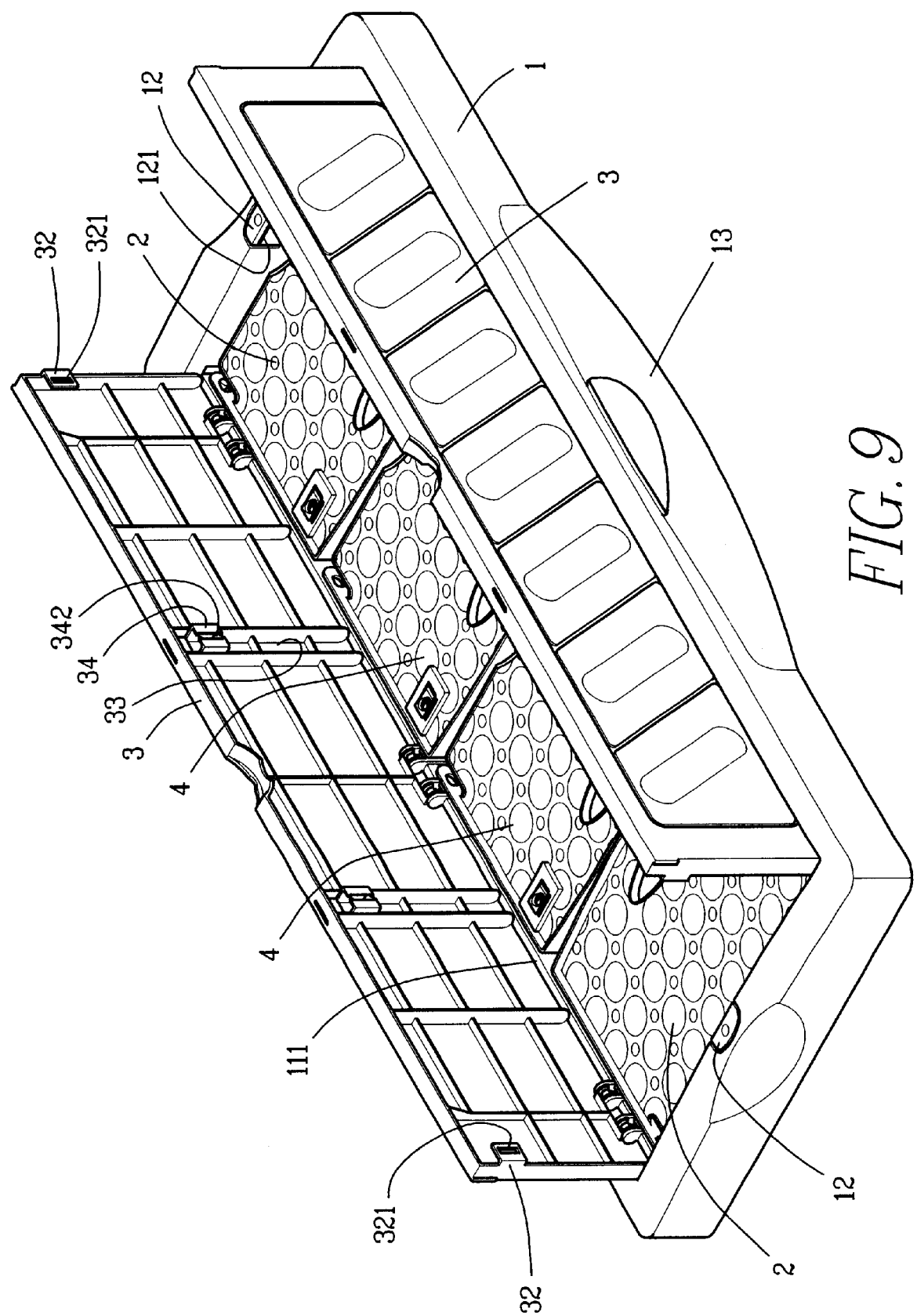
FIG. 9 is a perspective view of the article-collecting box in a collapsing process in the present invention.
Figure 10:
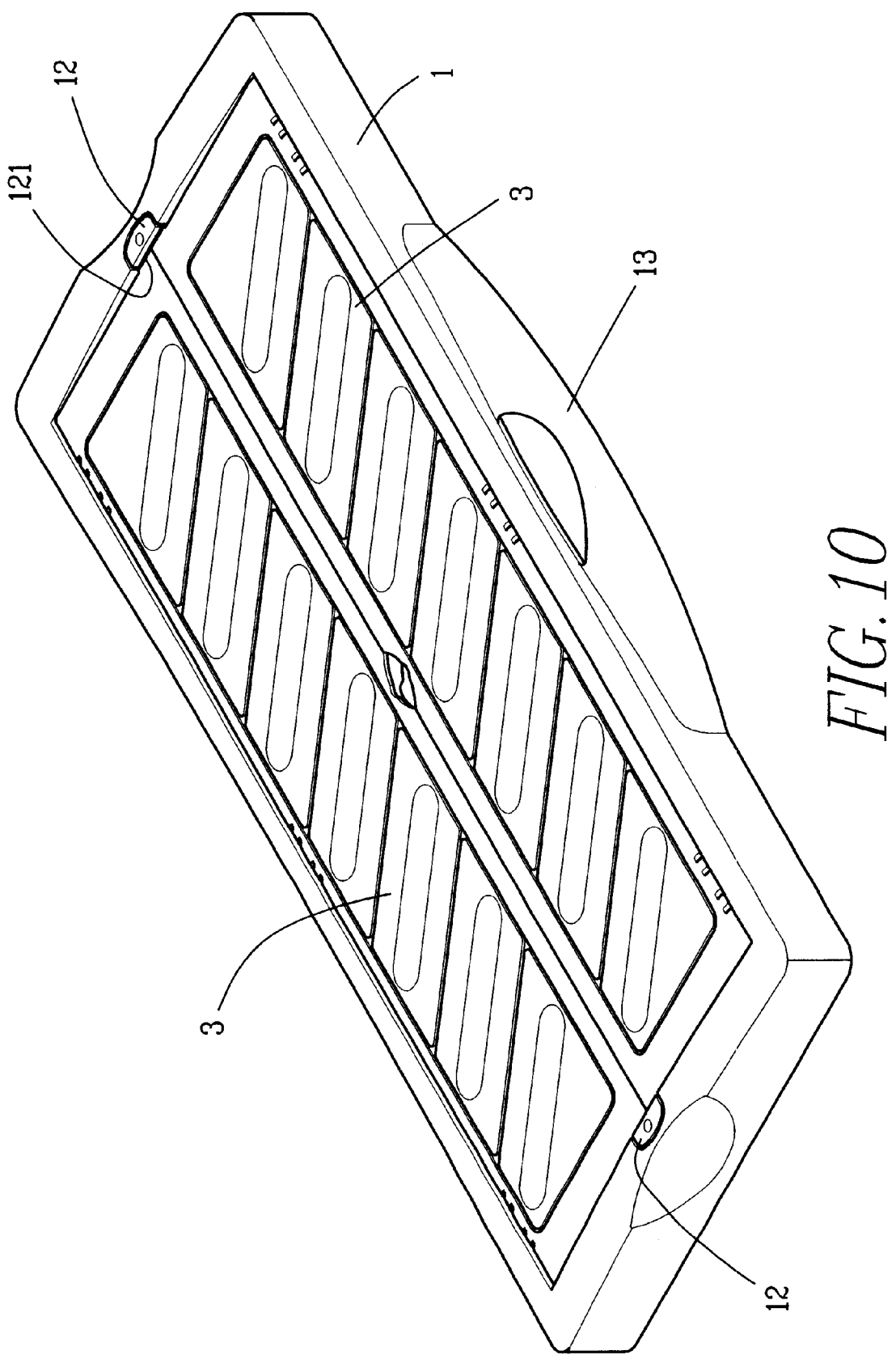
FIG. 10 is a perspective view of the article-collecting box after collapsed in the present invention.
Figure 11:
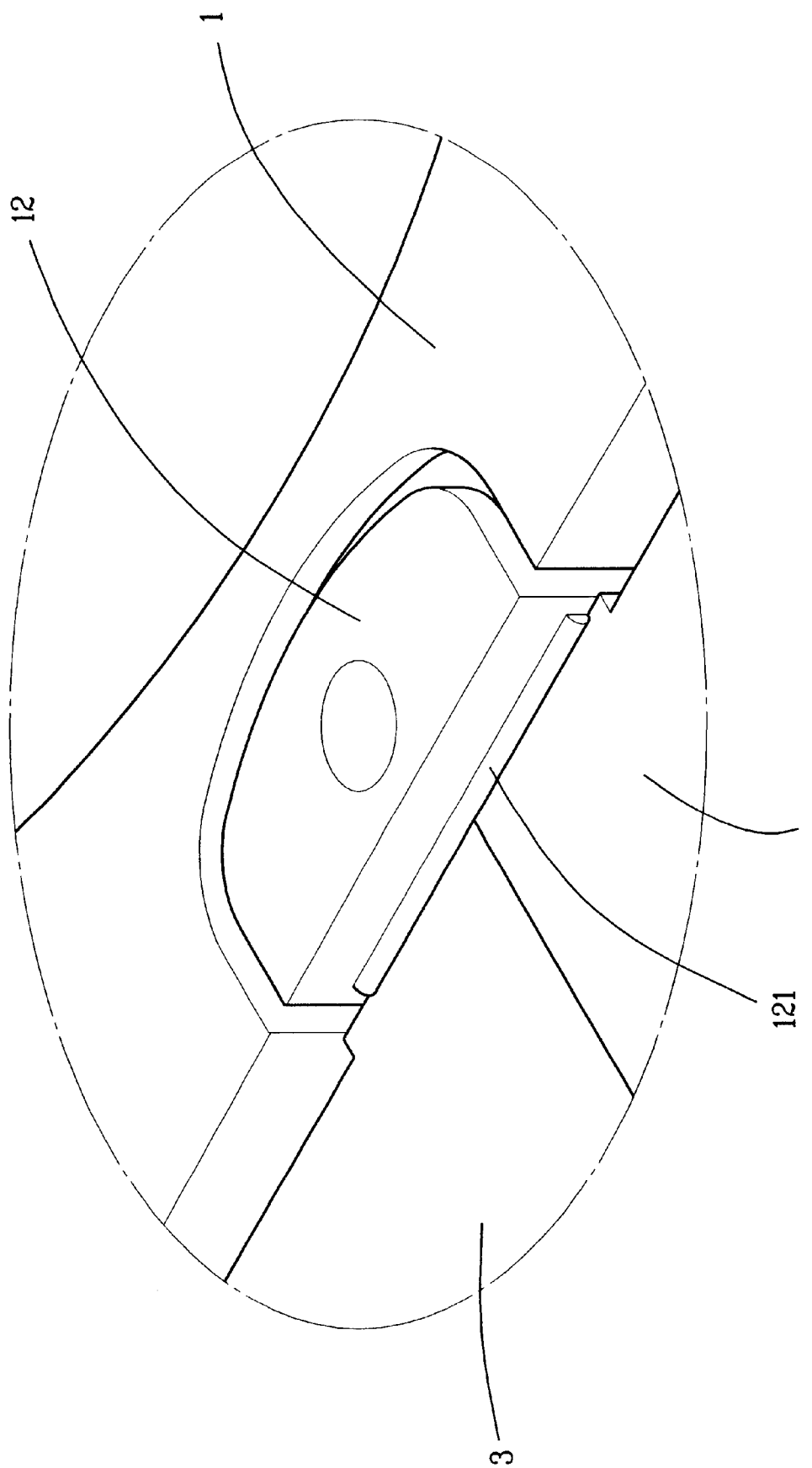
FIG. 11 is a partial magnified view of FIG. 10.
Figure 12:
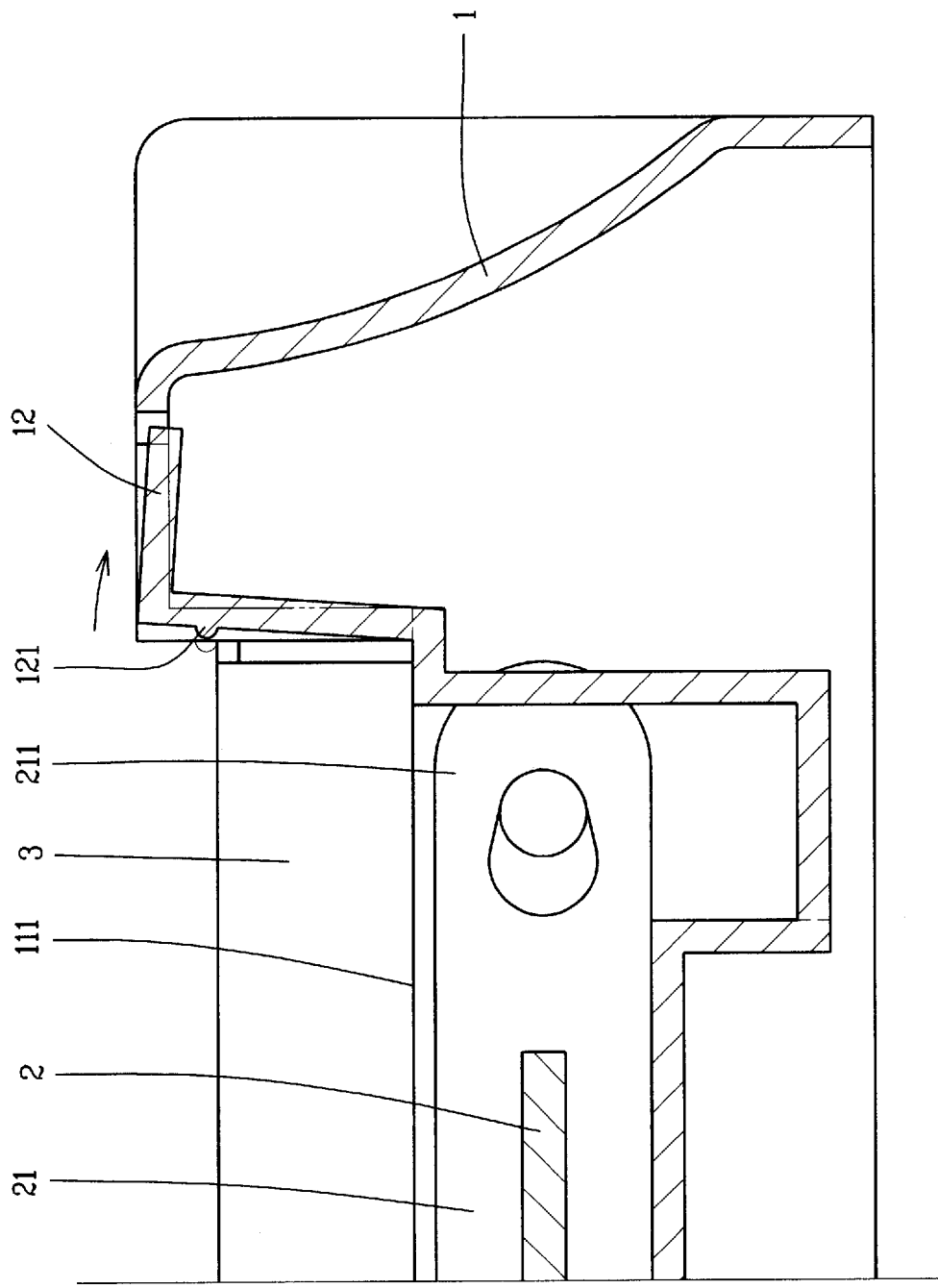
FIG. 12 is a side view of FIG. 11 in operating condition.

Moreover, an empty article-storing box placed in the automobile trunk can be collapsed so as to leave a comparatively large space for putting other things in the trunk. To collapse the box, firstly, remove the separating plates 4 out of the guide grooves 33 of the lengthwise side plates 3 and put them horizontally between two stepped surfaces 111 of the chamber 11, as shown in FIG. 9. Next, move the insert blocks 24 of the lateral side plates 2 to separate from the insert holes 321 of the hooks 32 of the lengthwise side plates 3 and then pivotally swing down the lateral side plates 2 toward the chamber 11 of the bottom base 1 to let them lie horizontally between the two stepped surfaces 111 of the chamber 11. And finally pivotally swing down the lengthwise side plates 3 inward to let them cover on the lateral side plates 2 and the separating plates 4, thus finishing collapsing the article-storing box, as shown in FIG. 10. In addition, after covering on the side plates 2 and the separating plates 4, make the lengthwise side plates 3 have their left and right end edges pass through the tongues 12 on the left and the right walls of the chamber 11 and then keep them in place by the stop member 121 of the tongues 12, becoming impossible to swing up automatically, as shown in FIG. 11. Thus the article-storing box is collapsed. On the contrary, when the box is to be evolved for use, only press downward the tongues 12 of the bottom base 1 to let the stop members 121 separate from the end edges of the lengthwise plates 3, as shown in FIG. 12, and then swing down the lengthwise side plates 3 and the side plates 2 to let them stand upright, recovering to the evolved condition for use, as shown in FIG. 8.

As can be understood from the above description, this invention has some advantages described below.

1. The separating plates 4 are movable, so a user has an alternative of using them or not depending on practical needs.
2. The through holes 22 and 42 preset on the lateral side plates 2 and the separating plates 4 facilitate a user to lift up and carry the box.
3. The lateral side plates 2 and the lengthwise side plates 3 are also collapsible, so the article-storing box takes small space in an automobile trunk after the box is collapsed.

While the preferred embodiment of the invention has been described above, it will be recognized and understood that various modifications may be made therein and the appended claims are intended to cover all such modifications that may fall within the spirit and scope of the invention.

I claim:

1. An article-storing box placed in an automobile trunk, said article-storing box comprising:

A bottom base provided with a chamber, said chamber having stepped surfaces formed respectively on its front and rear lengthwise side wall:

Two lateral side plates respectively having their bottom sides pivotally fitted between said left and said right stepped surfaces of said chamber to permit said lateral side plates to pivotally swing up and down inward and lie horizontally between said two stepped surfaces of said chamber when collapsed, two insert grooves provided through in two opposite side edges of each said lateral side plate, two insert blocks corresponding to said insert grooves provided in two opposite sides of each said lateral side plate, said insert blocks having projections for positioning in place when moved;

Two lengthwise side plates respectively having their bottom sides pivotally engaged on the front and the rear stepped surfaces of said chamber to let said lengthwise side plates pivotally swing up and down inward and cover on said lateral side plates when collapsed, two hooks formed integral on both ends, said hooks conforming to said insert grooves of said lateral side plate and having an insert-hole for receiving said insert block of said lateral side plate, plural guide grooves formed integral on an inner wall, said guide grooves facing with each other, a position member formed integral on an upper portion of each said guide groove, said position member aligned with said hook and having a recess in a center, said recess having an expanded position hole in its intermediate portion for receiving an insert block of a separating plate:

Plural separating plates being movable and having the same structure as that of said lateral side plates, each said separating plate pivotally combined between said two vertical grooves of said two lengthwise side plates and capable to swing up and down to rest horizontally on said bottom base when collapsed;

Said lengthwise side plates and said side plates orderly swung up and standing upright on said bottom base from a collapsed condition, said hooks of said lengthwise side plates inserted in said insert grooves of said lateral side plates, said insert blocks of said lateral side plates moved to extend out and inserted in said insert holes of said hooks, said separating plates respectively fitted between two said cover plates through said guide grooves in the inner walls of said lengthwise side plates, said insert blocks of said separating plates moved and inserted in said position hole of said position member, thus said article-storing box assembled in an evolved condition from a collapsed condition.

2. The article-storing box placed in an automobile trunk as claimed in claim 1, wherein plural pivotal connectors are formed integral on each said stepped surfaces of said chamber of said bottom base for said lengthwise side plates to be pivotally fitted thereon.

3. The article-storing box placed in an automobile trunk as claimed in claim 1, wherein an inverted U-shaped rib is fixed around the circumferential edge of each said lateral side plate, and said rib has two lugs respectively formed on its lower edges to fit pivotally between said two stepped surfaces of said chamber of said bottom base.

4. The article-storing box placed in an automobile trunk as claimed in claim 3, wherein two slots facing said insert grooves are respectively bored on two side edges of said rib of each said lateral side plate for receiving said insert blocks of said lateral side plate.

5. The article-storing box placed in an automobile trunk as claimed in claim 1, wherein an inverted U-shaped rib is fixed around a circumferential edge of each said separating plate, and two slots facing said insert grooves of each said separating plate are provided for receiving said insert blocks of each said separating plate.

6. The article-storing box placed in an automobile trunk as claimed in claim 1, wherein two flexible tongues are respectively formed on a center portion of the left and the right walls of said chamber of said bottom base, and each said tongue has a stop member protruding toward said chamber to stop and push against edges of said lengthwise side plates after said lengthwise side plates are pivotally swung down inward and cover on said lateral side plates.

7. The article-storing box placed in an automobile trunk as claimed in claim 1, wherein a grip is formed protruding out on a front side of said bottom base for carrying said box conveniently.

* * * * *